United States Patent [19]

Hallman

[11] Patent Number: 4,754,870

[45] Date of Patent: Jul. 5, 1988

[54] TWO MASS VIBRATING FEEDER

[75] Inventor: Richard A. Hallman, Columbia, S.C.

[73] Assignee: Litton Systems, Inc., Columbia, S.C.

[21] Appl. No.: 407,323

[22] Filed: Aug. 12, 1982

[51] Int. Cl.$^4$ .............................................. B65G 27/18
[52] U.S. Cl. .................................................... 198/770
[58] Field of Search ........................................ 198/770

[56] References Cited

U.S. PATENT DOCUMENTS

| 3,112,653 | 12/1963 | Morris | 198/770 X |
| 4,017,060 | 4/1977 | Brander et al. | 74/61 X |
| 4,040,303 | 8/1977 | Makino | 74/61 |

FOREIGN PATENT DOCUMENTS

| 1269830 | 6/1968 | Fed. Rep. of Germany | 198/770 |
| 847940 | 9/1960 | United Kingdom | 198/770 |

Primary Examiner—Joseph E. Valenza
Assistant Examiner—David A. Bucci
Attorney, Agent, or Firm—Morris I. Pollack

[57] ABSTRACT

A vibration exciter including a motor with eccentric counterweights is carried by a mounting frame so as to transmit vibrations to a vibrating feeder through a coil drive spring system. Eight coil drive springs are disposed in coaxial sets two sets to each side of said motor; the springs of each of such sets being disposed on opposite sides of a ledge formed as part of the mounting frame. A bolt extends through each aligned coil drive spring set to connect the vibration exciter, mounting frame and spring system to a vibrating feeder to form therewith a two mass vibrating feeder. Relatively stiff leaf spring type stabilizer springs also connect the mounting frame to the vibrating feeder but so as to minimize transmission of vibrating forces to the live frame, of the vibrating feeder, in directions transverse to the action direction of the spring system.

10 Claims, 2 Drawing Sheets

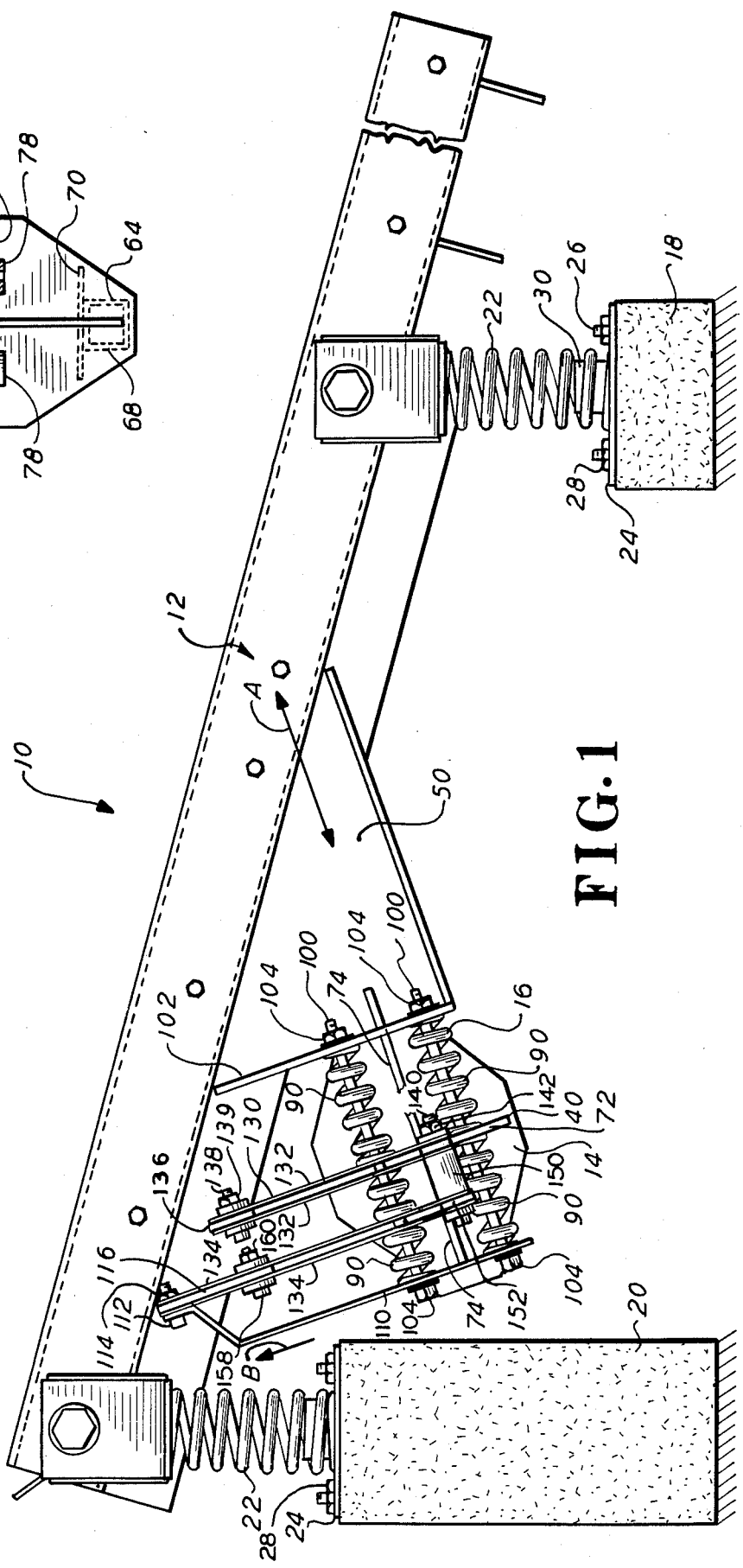
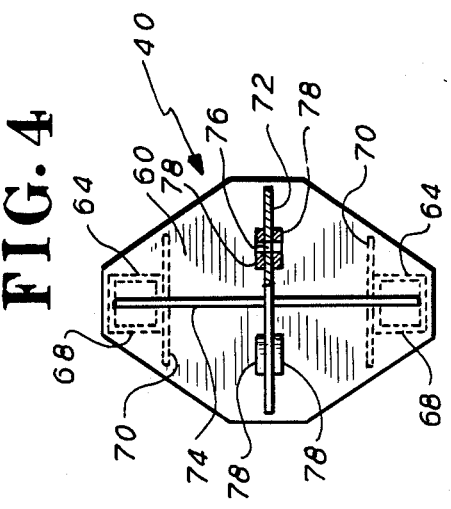
FIG. 4
FIG. 1

TWO MASS VIBRATING FEEDER

BACKGROUND OF THE INVENTION

This invention relates to two mass vibrating feeders; and more particularly to exciter systems and their mountings for two mass vibrating feeders.

BACKGROUND OF THE INVENTION—DESCRIPTION OF THE PRIOR ART

In two mass vibrating feeders, or natural frequency vibrating feeders as they are otherwise sometimes called, the object to be vibrated is connected to a vibration exciter by resilient elements which are usually designed to amplify the vibrations from the vibration exciter to the object to be vibrated, in a predetermined ratio. The object to be vibrated is one of the masses, and often takes the form of a feeder pan of otherwise conventional configuration and mounting; while the vibration exciter is the other mass and often takes the form of a motor rotating eccentrically disposed weights. The resilient elements are conventionally springs.

Some two mass vibrating feeders, such as those shown in U.S. Pat. Nos. 3,348,664 of E. J. Renner and 4,017,060 of J. E. Brander et al, dispose the motor driven exciter at the end of an axis passing through the coil springs. In such constructions the inherent tendency of the exciter, and its mounting, to move about the spring axis: can require complex exciter mounting structures; can create safety problems; and can produce undesired forces acting in directions other than along the spring axis (the desired direction of force transmittal).

Other two mass vibrating feeders, such as shown in U.S. Pat. No. 4,040,303 of S. Makino, surround the motor and exciter between the springs of the spring system; but in doing so create a relatively large motor, exciter, spring system subassembly which is cumbersome to handle and service, and relatively complex and costly to mount. Furthermore, undesired forces acting in directions other than along the spring axis must still be dealt with.

Various types of stabilizing systems, to minimize, direct, or otherwise control forces in undesired directions, have been put into use; however, more effective stabilizing systems are always desirable.

SUMMARY OF THE INVENTION

It is therefore an object of this invention to provide a new and improved two mass vibrating feeder;

It is another object of this invention to provide a new and improved exciter/drive spring arrangement for a two mass vibrating feeder;

It is yet another object of this invention to provide a new and improved exciter/drive spring mounting for a two mass vibrating feeder;

It is yet still another object of this invention to provide a new and improved stabilizing system for the exciter/drive spring arrangement for a two mass vibrating feeder.

This invention involves new and improved two mass vibrating feeders. It contemplates a stabilized exciter/drive spring arrangement and mounting for the two mass vibrating feeder wherein: the exciter is carried by a mounting frame which also mounts the drive springs; the drive springs are disposed on said mounting frame so that the exciter is axially sandwiched between the drive springs; and stabilizing elements rigidly connect the mounting frame and thus the exciter and drive springs to the feeder so as to minimize, a multiplication of forces other than along the drive spring axis.

Other objects, features, and advantages of the invention in its details of construction and arrangement of parts will be seen from the above, from the following description of the preferred embodiment when considered with the drawings and from the appended claims.

BRIEF DESCRIPTION OF THE DRAWING

In the drawing:

FIG. 1 is a side elevational view of a two mass vibrating feeder incorporating the instant invention;

FIG. 4 is an end view of the exciter base of FIG. 3.

DESCRIPTION OF THE PREFERRED EMBODIMENT

For convenience the invention will be described as applied to a vibrating feeder mounted on spring pads atop of suitably sized columns or pillars and excited by means of an electric motor driving eccentrically disposed counterweights about the motor axis of rotation; it being understood, nevertheless, that without departing from the scope of this invention that the vibrating feeder can be suspended by suitable means from suitable overhead mountings and that the exciter can be otherwise suitably driven.

Figure 2:
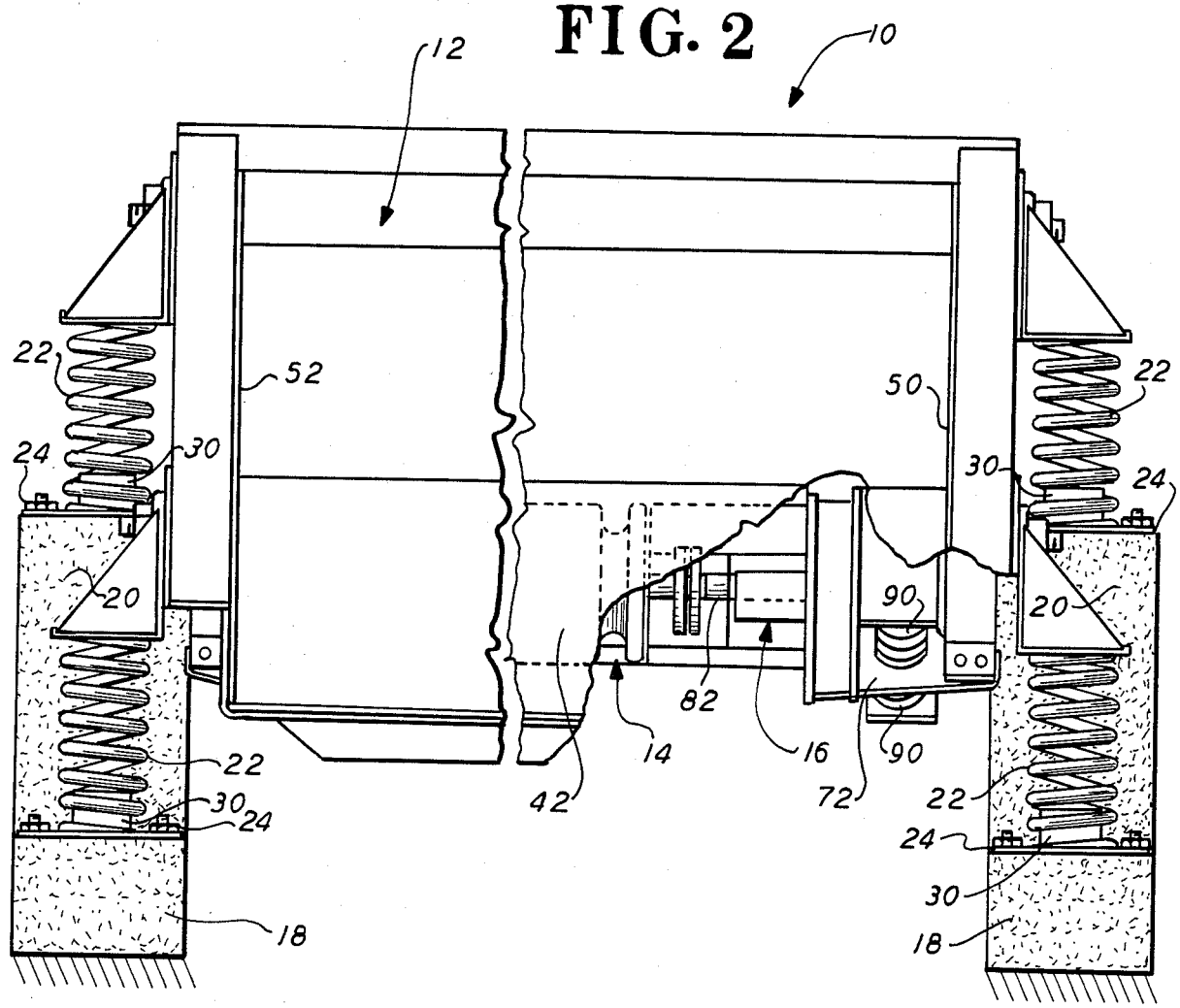
FIG. 2 is an end elevational view of the two mass vibrating feeder of FIG. 1, with parts cut away to better show details thereof.

With reference to FIGS. 1 and 2 there is shown a two mass vibrating feeder 10 including a live frame 12, vibration exciter 14, and drive spring system 16; all mounted upon pillars 18, 20 through spring pads 22. There are four spring pads 22 disposed two to each side of live frame 12, it being understood that more spring pads can be used if design and use criteria so dictate. Pillars 18, 20 are firmly secured in place, with the tops of pillars 20 disposed at a level above the tops of pillars 18 so that vibrating feeder 10 is disposed at a predetermined angle to the horizontal. A clamp plate 24 is disposed and suitably connected beneath each spring pad 22 so that each clamp plate 24 rests on top of its respective pillar 20, 18. A plurality of threaded rods 26, each embedded in and extending upwardly from pillars 20, 18, extend through openings suitably formed and positioned in clamp plates 24 to receive internally threaded nuts 28. A short tubular member 30, extending up from each clamp plate 24, fits within its respective spring pad 22. When clamp plates 24 are disposed with threaded rods 26 extending therethrough and nuts 28 tightened vibrating feeder 10 will be securely disposed for use.

If desired vibrating feeder 10 can be suspended by suitable conventional suspension means from appropriate overhead supports.

Two mass vibrating feeder 10 can thus be disposed at any suitable angle to the horizontal, or if desired in a horizontal position. In any such position vibration exciter 14 will function appropriately to vibrate live frame 12 through drive spring system 16.

Figure 3:
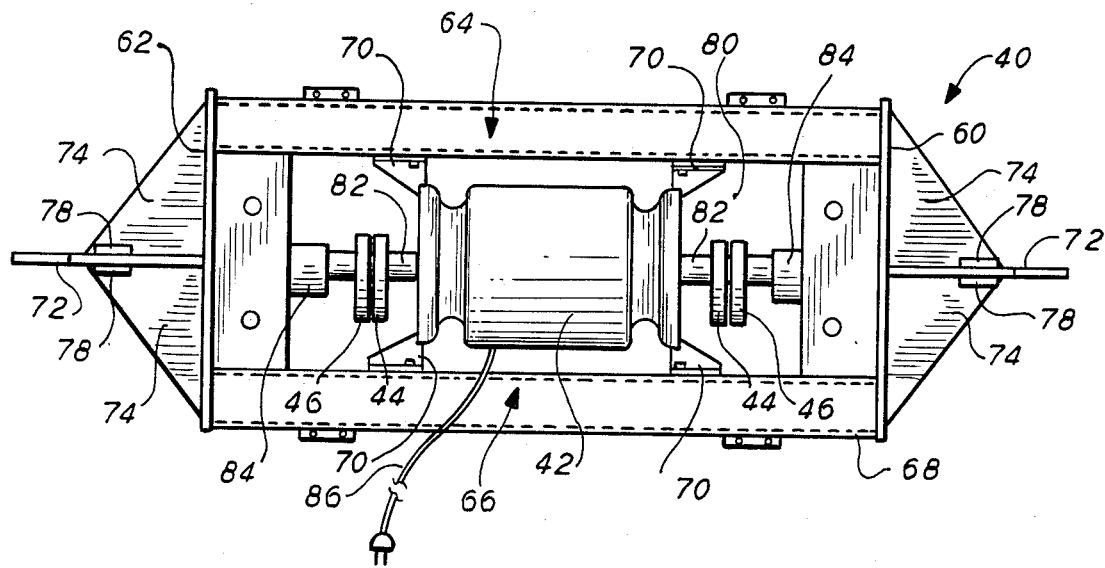
FIG. 3 is a plan view of the exciter base or mounting for the two mass vibrating feeder of FIGS. 1 and 2 with the exciter motor and counterweights shown in phantom as they would be mounted thereon.

A base or mounting frame 40 (FIGS. 1, 3 and 4) is formed to mount an exciter motor 42, suitable eccentrically disposed counterweights 44, and 46, and drive spring system 16. Mounting frame 40 is secured to mounting plates 50, 52 of live frame 12 as will be hereinafter explained. A pair of end plate assemblies 60, 62 are secured to and interconnect mounting bars 64, 66 in spaced relationship with each other. Each mounting bar 64, 66 includes a tubular member 68 and a number of connecting tabs 70 connected thereto, as by welding, and extending outwardly therefrom. A ledge 72 extends out from each end plate 60, 62; as do gusset plates 74 with all such members secured together, as by welding, to form a most rigid and compact mounting frame. A pair of spaced openings 76 (FIG. 4) are formed through each ledge 72. A pair of guide tubes are secured one to each side of ledge 72 at each such opening 76 with the openings of each such guide tube 78 aligned with opening 76; all for purposes to be hereinafter explained.

Exciter motor 42 is suitably secured in place centered within opening 80 defined by the space between end plates 60, 62 and mounting bars 64, 66. Suitably formed spacer plates (not shown) and attaching means such as bolts and nuts secure exciter motor 42 in position. An exciter motor shaft 82 extends through exciter motor 42 and out from each end thereof to receive inner counterweights 44 and outer counterweights 46 which are, in turn, appropriately secured to shaft 82. An appropriate number of tuning weights 84 are also suitably disposed on frame 40. A suitable electrical conductor 86 is electrically connected to exciter motor 42 and is formed to be suitably connected to an appropriate source of electrical energy through appropriate control means (not shown).

Counterweights 44, 46 and tuning weights 84 are disposed and selected in conventional manner to provide appropriate exciter forces of sufficient magnitude and direction to vibrate live frame 12 in desired manner.

Spring system 16 includes eight coil drive springs 90, divided respectively into four sets with two drive springs 90 in each such set. Two sets each containing two drive springs 90 are disposed at each axial end of exciter motor 42 in cooperative relationship with end plates 60, 62 respectively. Each drive spring set includes a first drive spring 90 disposed to one side of ledge 72 and a second drive spring 90 disposed to the other side of ledge 72 so that both such springs 90 are co-axially aligned and seated about respective guide tubes 78. A drive spring bolt 100 extends through both drive springs 90, opening 76 formed through ledge 72, and the openings of the aligned tubes 78.

A first end of each drive spring bolt 100 extends outwardly from the end of drive springs 90 and then through openings formed in lips 102 of mounting plates 50, 52 respectively. Suitable threads (not shown) are formed on such ends of bolts 100 to receive internally threaded nuts 104. Metal, rubber or other suitable washers may be inserted between nuts 104 and lips 102 of mounting plates 50, 52 if desired or required.

The other end of each drive belt 100 extends outwardly from the other end of the opposed drive spring 90 of each spring set. Each such other end of bolts 100 extend through openings (not shown) suitably forced and sized proximate one end of a drive spring seat 110, and are suitably threaded to receive nuts 104. Metal, rubber or other suitable washers may be inserted between nuts 104 and spring seat 110 if desired or required. It should be remembered that there are two such spring seats 110; one on each side of live frame 12. The other ends of each spring seat 110 are connected by bolts 112 and nuts 114 to bracket 116 secured to and extending out from each side of live frame 12.

With drive springs 90, of each spring set, disposed in positions of co-axial alignment proximate ledges 72, and with bolts 100 extending through springs 90 and the openings in lips 102 and spring seat 110, nuts 104 are tightened so that all drive springs 90 are in compression at all times. That is springs 90 must be in compression with exciter 14 at rest and with exciter 14 in all phases of its operation. This is the way that mounting frame 40 is mounted to live frame 12 so that during the operation of motor 42 and exciter 14 the forces generated thereby are transmitted to spring system 16, and by spring system 16 to live frame 12. The extent to which the forces so generated are magnified depends upon the spring system selected and is derived in conventional manner.

While a spring system 16 has been shown including four pairs of drive springs disposed two pairs on each side of exciter 14, it should be understood that: other combinations of springs and disposition are possible. For example, spring system 16 could include six pair of drive springs with three aligned pairs of springs disposed to each side of exciter 14. Alternatively, if eight sets of springs were used they could be disposed four sets to each side of exciter 14; with each group of four sets of springs disposed in two aligned rows. The two aligned rows may either be outside of mounting plates 50, 52, as shown for springs 90, or one row of two pairs of drive springs may be disposed outwardly of mounting plates 50, 52 and the other row of two pairs of drive springs may be disposed inwardly of such mounting plates. Obviously, a similar set of drive springs would be disposed on the other side of the live frame. Alternate numbers and arrangements of drive springs are contemplated by this invention; with the understanding that such drive springs are to be symetrically disposed with respect to the exciter motor and live frame and so as to form a compact sandwich axially aligned with the exciter.

It is most important in two mass vibrating feeders that the forces generated by exciter 14, and transmitted by spring system 16, be maximized along the axis "A" (FIG. 1) of drive springs 90; and that the action of such forces in other directions, for example in directions perpendicular to axis "A", be minimized. To accomplish this a stabilizer system 130 is provided for each side of mounting frame 40 to connect mounting frame 40 to live frame 12 so that forces acting other than along axis "A" are not magnified.

Each stabilizer system 130 includes a first pair of relatively stiff flat leaf springs 132, and a second pair of relatively stiff flat leaf springs 134. The first pair of leaf springs 132 are disposed parallel to each other. One end of each leaf spring 132 is disposed to each side of a lip 136 extending out from live frame 12. A bolt 138 is passed through suitably formed and aligned openings (not shown) in lip 136 and leaf springs 132, and leaf springs 132 are secured to live frame 12 by tightening a nut 139 onto bolt 138. The other ends of leaf springs 132 are disposed to each side of ledge 72 of mounting frame 40. A threaded rod 140 is passed through aligned openings in this other end of each leaf spring 132 and ledge 72 and is secured in place by a nut 142.

Threaded rod 140 also receives a spacer 150, and passes through threaded openings formed in leaf springs 134. Leaf springs 134 are also disposed in parallel relationship one with respect to the other. Suitable spacers 152 are disposed between leaf springs 134 to space one from the other at the ends thereof secured to rod 140. The opposite ends of leaf springs 134 are disposed one to each side of lip 116. A bolt 158 and nut 160 secure this end of leaf springs 134 to lip 116.

Leaf springs 132, 134 are very stiff and while able to flex in the direction of axis "A" do not magnify any forces springs 132, 134.

Thus forces generated by exciter 14 are magnified according to preselected criteria, in the direction of arrow A, and not magnified in the direction of arrow B. At the same time the exciter/spring system combination is quite compact with exciter 14 sandwiched, in the axial direction, between drive springs 90 of spring system 16.

From the above description it will thus be seen that there has been provided a new and improved two mass vibrating feeder; which two mass vibrating feeder utilizes a compact vibration exciter/drive spring arrangement, with the vibration exciter and drive springs carried by and cooperating with a mounting frame that mounts the drive springs so as to axially sandwich the vibration exciter therebetween, and with a stabilizer system of relatively stiff flat leaf springs to minimize the transmission of forces from the vibration exciter to the feeder live frame in directions other than along the axis of the drive spring system.

It is understood that although I have shown the preferred embodiment of my invention that various modifications may be made in the details thereof without departing from the spirit as comprehended by the following claims.

I claim:

1. A two mass vibrating feeder; comprising:
   (a) a live frame;
   (b) a vibration exciter including powered motor means for effecting rotation of a drive shaft about a predetermined axis of rotation;
   (c) a spring system including a plurality of drive spring sets;
   (d) a mounting frame;
   (e) attaching means securing said vibration exciter to said mounting frame and with a predetermined axial orientation for said predetermined axis of rotation;
   (f) at least a first of said drive spring sets disposed axially to one side of said vibration exciter and for cooperation with said mounting frame;
   (g) at least a second of said drive spring sets disposed axially to the other side of said vibration exciter and in symetrical disposition with respect to said first of said drive spring sets and for cooperation with said mounting frame;
   (h) a plurality of drive bolts; each such drive bolt extending through one of said drive spring sets and said mounting frame and being secured to said live frame so as to facilitate transmittal of vibration forces generated by said vibration exciter to said drive spring sets and from said drive spring sets to said live frame to vibrate said live frame in a predetermined manner.

2. The two mass vibrating feeder of claim 1 wherein said vibration exciter includes an electrically powered motor with eccentrically disposed counterweights driven by said drive shaft extending from said motor.

3. The two mass vibrating feeder of claim 1 wherein there are four drive spring sets symetrically disposed two sets to each axial side of said vibration exciter.

4. The two mass vibrating feeder of claim 3 wherein each of said drive spring sets include a pair of co-axially aligned coil springs disposed one to each side of a ledge carried by and extending from said mounting frame.

5. The two mass vibrating feeder of claim 4 wherein each of said drive bolts extends through both of said coil springs of each drive spring set, and an opening formed in said ledge.

6. The two mass vibrating feeder of claim 5 wherein all springs of said drive spring sets are always in compression.

7. The two mass vibrating feeder of claim 1 wherein stabilizing means are provided to interconnect said mounting frame to said live frame means.

8. The two mass vibrating feeder of claim 7 wherein said stabilizing means includes a first stabilizer system disposed to one side of said mounting frame and a second stabilizer system disposed to the other side of said mounting frame.

9. The two mass vibrating feeder of claim 8 wherein each stabilizer system includes a pair of leaf spring sets connected to each other and to said mounting frame and said live frame in such a way as to minimize transmission of vibrating forces to said live frame in directions other than along the axis of said spring system.

10. A vibration exciter and spring system mounting means for a two mass vibrating feeder; comprising:
   (a) a vibration exciter including powered motor means for effecting rotation of a drive shaft about a predetermined axis of rotation;
   (b) a spring system;
   (c) a mounting frame;
   (d) first mounting means mounting said vibration exciter to said mounting frame with a predetermined axial alignment for said predetermined axis of rotation;
   (e) second mounting means mounting said spring system to said mounting frame so that a first portion of said spring system is disposed axially to one side of said vibration exciter, and so that a second portion of said spring system is disposed axially to the other side of said vibration exciter and so as to be in symetrical disposition with respect to said first portion of said spring system; and
   (f) bolt means extending through said each portion of said spring system and said mounting frame and adapted to connect said spring system, vibration exciter, and mounting frame to the live frame of a vibrating feeder.

* * * * *